(12) United States Patent
Fukuda et al.

(10) Patent No.: US 7,355,549 B2
(45) Date of Patent: Apr. 8, 2008

(54) APPARATUS AND METHOD FOR CARRIER PHASE-BASED RELATIVE POSITIONING

(75) Inventors: Masaru Fukuda, Nishinomiya (JP); Koji Hayashi, Nishinomiya (JP)

(73) Assignee: Furuno Electric Company, Ltd., Nishinomiya (JP)

( * ) Notice: Subject to any disclaimer, the term of this patent is extended or adjusted under 35 U.S.C. 154(b) by 0 days.

(21) Appl. No.: 11/501,504

(22) Filed: Aug. 8, 2006

(65) Prior Publication Data

US 2007/0040737 A1 Feb. 22, 2007

(30) Foreign Application Priority Data

Aug. 8, 2005 (JP) ............... 2005-228953

(51) Int. Cl.
*G01S 5/14* (2006.01)
(52) U.S. Cl. ............... 342/357.04; 342/357.11; 342/357.14
(58) Field of Classification Search ........... 342/357.02, 342/357.04, 357.06, 357.11, 357.14; 701/213, 701/215
See application file for complete search history.

(56) References Cited

U.S. PATENT DOCUMENTS 5,787,384 A * 7/1998 Johnson ............... 701/216
6,424,915 B1 * 7/2002 Fukuda et al. ........... 701/214
6,480,152 B2 * 11/2002 Lin et al. ............ 342/357.14
6,611,228 B2 8/2003 Toda et al.
2003/0176970 A1 * 9/2003 Lin ........................ 701/214

OTHER PUBLICATIONS

Hatch, "Ambiguity Resolution in the Fast Lane," Proceedings of the Second International Technical Meeting of the Institute of Navigation, pp. 45-50 (1989).
Teunissen, "A New Method for Fast Carrier Phase Ambiguity Estimation," IEEE—Position Location and Navigation Symposium PLANS 1994, pp. 562-573 (1994).

* cited by examiner

*Primary Examiner*—Dao Phan
(74) *Attorney, Agent, or Firm*—John J. Penny, Jr.; Edwards Angell Palmer & Dodge LLP

(57) ABSTRACT

A carrier phase-based relative positioning apparatus includes a plurality of antennas fixedly mounted on a moving body for receiving positioning signals from satellites, an inertial measurement unit (IMU) for measuring accelerations and angular velocities of the moving body, a reference attitude calculator for calculating attitude information about the attitude of the moving body from observables of the IMU at least before an integer ambiguity candidate is initially determined, an integer ambiguity estimator for estimating integer ambiguity candidates from the positioning signals received by the antennas, and an integer ambiguity validator for evaluating correctness of the integer ambiguity candidates estimated by the integer ambiguity estimator.

20 Claims, 5 Drawing Sheets

APPARATUS AND METHOD FOR CARRIER PHASE-BASED RELATIVE POSITIONING

CROSS REFERENCE OF RELATED APPLICATION

Japanese Patent Application Tokugan No. 2005-228953 is hereby incorporated by reference.

BACKGROUND OF THE INVENTION

1. Field of the Invention

The present invention relates generally to an integrated Global Positioning System/Inertial Navigation System (GPS/INS) apparatus provided with a plurality of GPS antennas fixedly mounted on a moving body (i.e., a mobile vehicle like a ship) and an inertial sensing system and, more particularly, the invention is concerned with a method of examining and validating integer ambiguity candidates by using attitude information in an integrated GPS/INS apparatus.

2. Description of the Related Art

An attitude determination apparatus for determining the attitude of a moving body by using a plurality of GPS antennas and an inertial sensing system is an example of a conventional carrier phase-based relative positioning apparatus. Typically, an attitude determination apparatus including a plurality of GPS antennas and inertial sensors rigidly fixed to a moving body measures carrier phase differences from signals received from multiple GPS satellites by antenna pairs, calculates position vectors (or baseline vectors) of the individual antennas except for one used as a reference antenna relative to the reference antenna from carrier phase difference observables, and determines the attitude of the moving body from the baseline vectors.

In this kind of relative positioning based on carrier phase differences, it is necessary to determine integer ambiguities before calculating baseline vectors. Fast determination of correct integer ambiguities is a main technical issue in carrier phase-based relative positioning. Techniques for fast integer ambiguity resolution are described in the following patent and non-patent publications, for example:

(1) U.S. Pat. No. 6,611,228;
(2) R. R. Hatch, "Ambiguity Resolution in the Fast Lane," Proceedings of the Second International Technical Meeting of the Institute of Navigation, Colorado Springs, Colo., 1989;
(3) P. J. G. Teunissen, "A New Method for Fast Carrier Phase Ambiguity Estimation," Proceedings IEEE Position, Location and Navigation Symposium PLANS '94, Las Vegas, Nev., April 11-15, pp. 562-573.

Determination of integer ambiguities is generally a two-step procedure involving determination of the sets of integer ambiguity candidates and validation of the sets of integer ambiguity candidates. Integer ambiguity resolution for obtaining integer ambiguity candidate sets is a process of calculating float solutions of integer ambiguities and then determining p number of integer ambiguity candidate sets $(N_1, N_2, \ldots, N_k)_p$. Validation of the integer ambiguity candidate sets is a process of examining the integer ambiguity candidate sets and selecting one set of correct integer ambiguities.

Generally speaking, various kinds of a priori information are used for validation of the integer ambiguity candidate sets. Typically, validation of the integer ambiguity candidate sets is accomplished by using such a priori information as known information on baseline lengths or information on antenna geometry including the inner product or cross product of each pair of baseline vectors as described in U.S. Pat. No. 6,611,228 on "Carrier Phase-Based Relative Positioning Apparatus." According to the Publication, this ambiguity validation approach yields a probability of correct integer estimation, or success rate, of approximately 90% to 95%.

To examine and validate the integer ambiguity candidate sets by using the a priori information on all the aforementioned antenna geometry, however, it is necessary to obtain a plurality of baseline vectors with at least three antennas rigidly mounted on a moving body. If one attempts to examine and validate the integer ambiguity candidate sets with a single baseline obtained from two antennas only, the a priori information on the antenna geometry available for ambiguity validation is for that baseline length only and, under this circumstance, the ambiguity validation approach of the aforementioned Publication can provide a correct integer ambiguity candidate set at a much decreased success rate. Especially when only a small number of GPS satellites are available or when measurements are affected by multipath disturbance, there arises a problem that the success rate of identifying a correct integer ambiguity candidate set decreases to an unacceptably low level for practical use.

On the other hand, in a carrier phase-based relative positioning apparatus developed with special emphasis on compact design, it is particularly important to achieve a nearly 100% success rate of obtaining a correct integer ambiguity set and, thus, there is a growing demand for an improved ambiguity validation technique.

U.S. Pat. No. 6,611,228 describes an ambiguity validation technique for examining and validating integer ambiguity candidates by using information on the attitude of a moving body, the technique involving a process of examining the integer ambiguity candidates by using attitude information delivered from an INS apparatus. This ambiguity validation technique has a problem that the attitude information can not be obtained from the INS apparatus until integer ambiguities are first determined, so that the attitude information can not be used for examining and validating the integer ambiguity candidates in an initial stage.

SUMMARY OF THE INVENTION

The present invention is intended to overcome the aforementioned problems of the prior art. Accordingly, it is a first object of the invention to permit examination and validation of integer ambiguity candidates by using information on the attitude of a moving body not only in an event of integer ambiguity re-determination but also in initial determination of integer ambiguities immediately after power-on. It is a second object of the invention to provide a method of obtaining a correct integer ambiguity candidate set at a high success rate even under conditions of a single baseline and a minimum necessary number of GPS satellites available where examination and validation of integer ambiguity candidates are difficult.

According to the invention, a carrier phase-based relative positioning apparatus is provided with a plurality of antennas fixedly mounted at known positions in a body coordinate system defined on a moving body for receiving positioning signals from satellites and an inertial measurement unit (IMU) fixedly mounted on the moving body for measuring accelerations and angular velocities of the moving body. To accomplish the aforementioned objects of the invention, the carrier phase-based relative positioning apparatus calculates attitude information about the attitude of the moving body from observables of the IMU at least before an integer ambiguity is initially determined, estimates integer ambiguity candidates from the positioning signals received by the antennas, and evaluates correctness of the integer ambiguity candidates based on a comparison between attitude information calculated by using the estimated integer ambiguity candidates and the attitude information calculated by using the observables of the IMU. The carrier phase-based relative positioning apparatus thus structured can obtain a correct integer ambiguity set at a high success rate not only in an event of initial determination of integer ambiguities immediately after power-on but in integer ambiguity resolution.

In one feature of the invention, the IMU includes accelerometers, and the carrier phase-based relative positioning apparatus calculates roll and/or pitch angles of the moving body from observables obtained by the accelerometers. This feature makes it possible to calculate the roll and/or pitch angles of the moving body by a simple mathematical operation.

In another feature of the invention, the carrier phase-based relative positioning apparatus calculates velocity of the moving body in a moving direction thereof in the body coordinate system or obtains the same from an external source, and calculates roll angle of the moving body from the velocity of the moving body in the moving direction thereof and observables obtained from the IMU. This feature makes it possible to calculate the roll angle of the moving body with higher accuracy compared to a method of calculating the roll angle from only acceleration observables.

In another feature of the invention, one of baselines formed by the plurality of antennas lies along the moving direction aligned x-axis of the body coordinate system of the moving body, and the carrier phase-based relative positioning apparatus calculates the velocity of the moving body in the moving direction aligned x-axis of in the body coordinate system from velocity of the moving body in a navigation coordinate system calculated by using the signals received by the antenna on the assumption that only the velocity of the moving body in the moving direction aligned x-axis of the body coordinate system is a velocity component of the moving body in the body coordinate system. This feature makes it possible to calculate the velocity of the moving body in the moving direction thereof by an approximation approach so that information on the velocity of the moving body can be used when calculating the attitude information by using the observables of the IMU.

In still another feature of the invention, the carrier phase-based relative positioning apparatus can detect heading of the moving body from velocity thereof in a navigation coordinate system calculated by using signals received by the antenna. This feature makes it possible to calculate the heading of the moving body from the velocity thereof in the navigation coordinate system. Consequently, it becomes possible to examine and validate the integer ambiguity candidates by using full attitude information (including roll angle, pitch angle and heading) of the moving body so that correct integer ambiguity candidates can be obtained at a high success rate.

In yet another feature of the invention, the carrier phase-based relative positioning apparatus estimates and corrects an error of the IMU once the integer ambiguity set have been determined, and change the threshold of criterion used for validation of the integer ambiguity candidates at different levels before and after correction of the error of the IMU. This feature makes it possible to vary the criterion for validation of the integer ambiguity candidates in accordance with accuracy of the calculated attitude information of the moving body so that the integer ambiguity candidates can be examined and validated with higher accuracy.

Overall, the present invention makes it possible to examine and validate the integer ambiguity candidates by using the attitude information about the moving body not only in an event of integer ambiguity resolution but also in initial determination of integer ambiguities immediately after power-on. This serves to reduce start-up time of the apparatus. Also, the invention provides more options among which a method of examining and validating the integer ambiguity candidates can be chosen than in the prior art, making it possible to achieve a higher success rate of identifying correct integer ambiguity candidates.

Additionally, the present invention makes it possible to examine and validate the integer ambiguity candidates with high accuracy even when only a single baseline is available, thus contributing to a reduction in size and cost of the apparatus.

These and other objects, features and advantages of the invention will become more apparent upon a reading of the following detailed description in conjunction with the accompanying drawings.

DETAILED DESCRIPTION OF THE PREFERRED EMBODIMENT OF THE INVENTION

A carrier phase-based relative positioning apparatus according to a preferred embodiment of the invention is now described with reference to the accompanying drawings.

Figure 1:
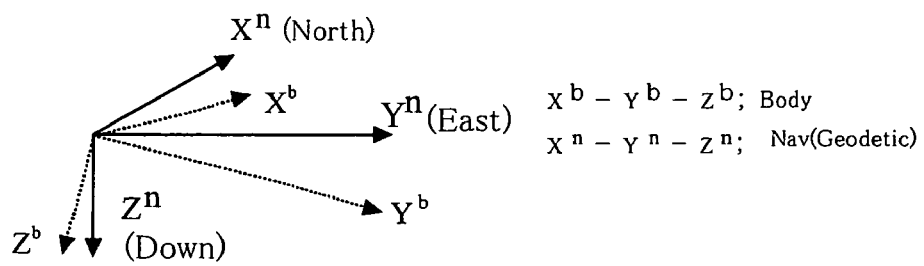
FIGS. 1A and 1B are diagrams showing a relationship between a navigation coordinate system and a body coordinate system used in the present invention and inertial sensor and GPS antenna locations, respectively.
Figure 1:
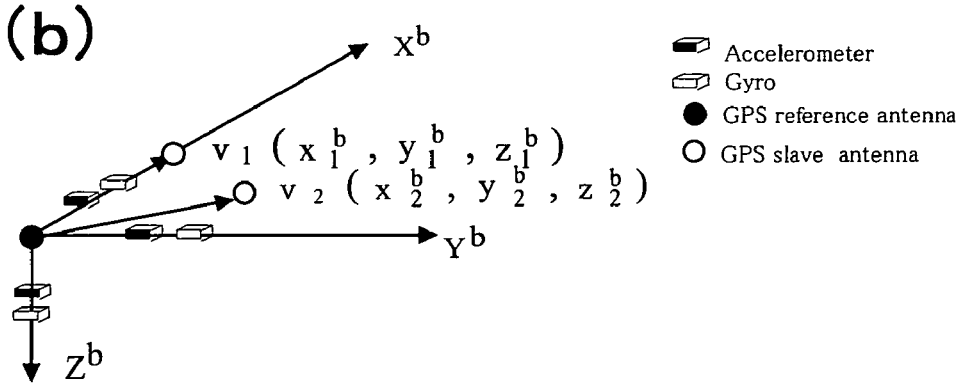

FIGS. 1A and 1B are diagrams showing a relationship between a navigation coordinate system and a body coordinate system used in the present invention and inertial sensor and GPS antenna locations, respectively. In the following discussion of the invention, a superscript "n" affixed to a variable indicates that the variable is concerned with the navigation coordinate system, whereas a superscript "b" affixed to a variable indicates that the variable is concerned with the body coordinate system. The navigation coordinate system used in this invention is defined based on an appropriate geodetic coordinate system.

Referring to FIG. 1A, the navigation coordinate system is a right-handed Cartesian coordinate system of which x- and y-axes represent north and east, respectively. The body coordinate system is also a right-handed Cartesian coordinate system of which x- and y-axes represent forward and right-hand directions of a moving body. In a case where the moving body is a ship, the positive direction of the x-axis corresponds to the ship's heading while the positive direction of the y-axis corresponds to a starboard side of the ship. Although origins of the navigation and the body coordinate systems need not necessarily coincide with each other if the relationship between the two coordinate systems is known, the origins of the coordinate systems are matched in this embodiment as shown in FIG. 1A for ease of understanding.

FIG. 1B illustrates the locations of a plurality of GPS antennas and inertial sensors installed on the body coordinate system shown in FIG. 1A. One of the GPS antennas located at the origin of the body coordinate system is a reference antenna while the others are slave antennas. The GPS antennas are installed such that a baseline vector formed by at least one of the slave antennas lies on the x-axis of the body coordinate system while baseline vectors formed by the other slave antennas are oriented in directions other than the x-axis.

As illustrated in FIG. 1B, the x-axis represents an intended moving direction of such a moving body as a ship or a land vehicle. If the moving body is a ship, for instance, the x-axis indicates the ship's heading and, in this case, at least one of the slave antennas is installed on the x-axis defined a center line of the ship. This is because information on the attitude of a moving body (attitude information) is normally detected with reference to the intended moving direction of the moving body. If the amounts of deviations of the antenna locations from the axes of the body coordinate system is known, however, the GPS antennas may practically be installed at any locations onboard. While FIG. 1B shows an example of an antenna system including two slave antennas, the provision of at least one slave antenna will suffice for the working of the present embodiment.

The inertial sensors, which may collectively be referred to as an inertial measurement unit (IMU), include accelerometers and angular velocity sensors mounted in pairs on three perpendicular axes (x-, y- and z-axes) of the body coordinate system as shown in FIG. 1B. Specifically, one pair of accelerometer and angular velocity sensor is mounted on each of the three perpendicular axes in such a manner that sensitive axes of the accelerometer and the angular velocity sensor match the corresponding one of the three perpendicular axes of the body coordinate system. This configuration makes it possible to directly use observables concerning accelerations of the moving body along its fore/aft, left/right and up/down directions and of angular velocities of rotary motion of the moving body about these directions (x-, y- and z-axes) as obtained by the respective inertial sensors. In this connection, it is to be noted that the sensitive axes of the inertial sensors defined in the IMU need not necessarily match the three perpendicular axes of the body coordinate system, respectively, if angular deviations of the sensitive axes from the axes of the body coordinate system are known. Even in the presence of such angular deviations of the sensitive axes, it is possible to obtain correct accelerations and angular velocities of the moving body along and about its fore/aft, left/right and up/down directions by performing a mathematical operation on the observables given by the individual inertial sensors to make up for the angular deviations of the sensitive axes.

Figure 2:
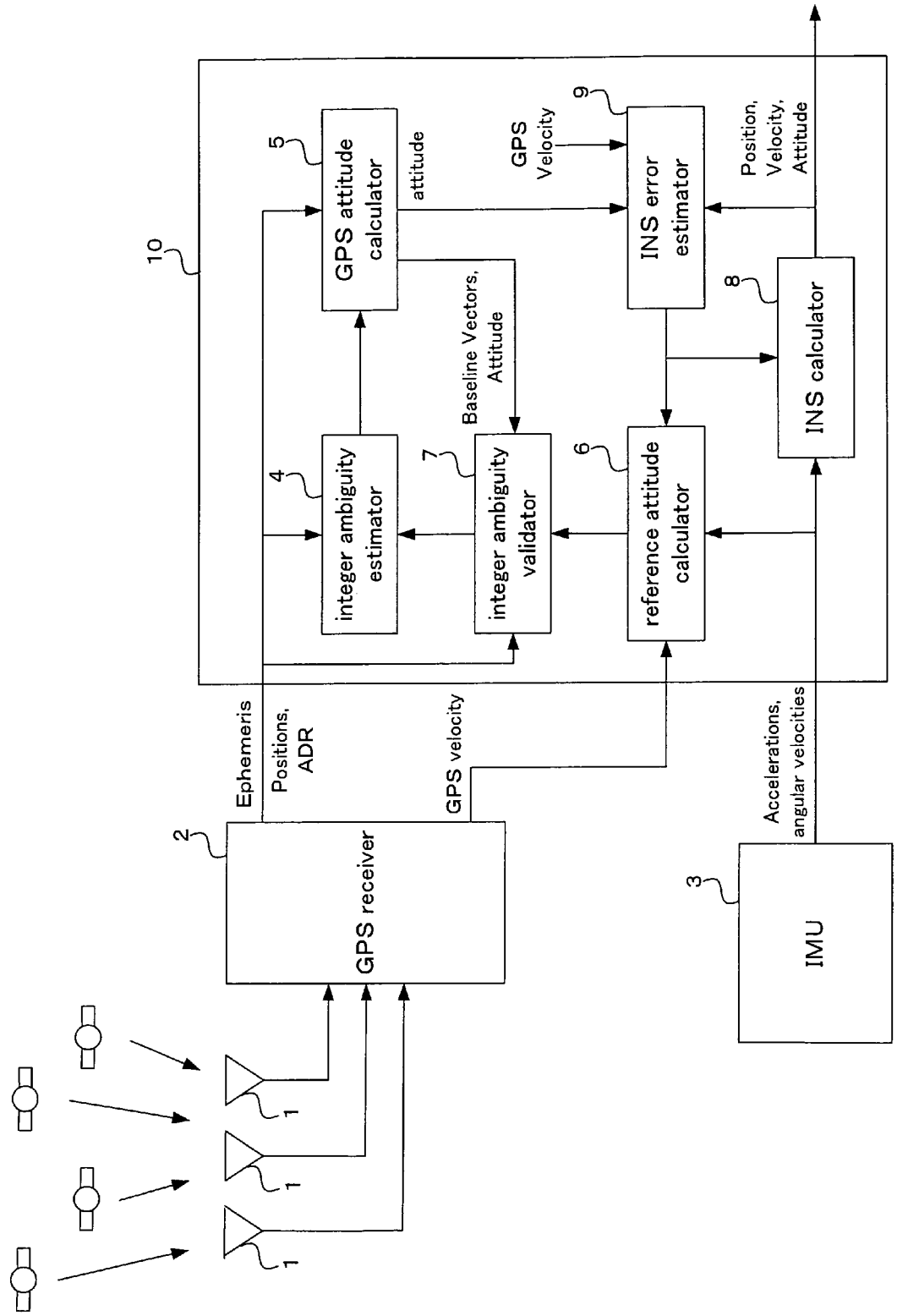
FIG. 2 is a block diagram showing an example of a configuration of the carrier phase-based relative positioning apparatus according to the embodiment of the invention.

FIG. 2 is a block diagram showing an example of a configuration of the carrier phase-based relative positioning apparatus according to the preferred embodiment of the invention. The carrier phase-based relative positioning apparatus of FIG. 2 is a multiple antenna GPS (MAGPS)/INS system provided with three GPS antennas 1 which are rigidly mounted on the moving body.

Referring to FIG. 2, the carrier phase-based relative positioning apparatus of the embodiment includes the three GPS antennas 1, a GPS receiver 2, an IMU 3 and a processing unit 10, the processing unit 10 including an integer ambiguity estimator 4, a GPS attitude calculator 5, a reference attitude calculator 6, an integer ambiguity validator 7, an INS calculator 8 and an INS error estimator 9.

The GPS antennas 1 and the IMU 3 are rigidly installed on the moving body, the IMU 3 including a plurality of inertial sensors as already discussed with reference to FIG. 1B. While there are provided three GPS antennas 1 installed on the moving body in the example shown in FIG. 2, at least two GPS antennas 1 are required for carrying out the invention. Also, the IMU 3 is required in principle to include a minimum necessary number of inertial sensors depending on kinds of information to be measured or demanded accuracy. This means that the IMU 3 need not necessarily include three each accelerometers and angular velocity sensors mounted on the three axes of the body coordinate system representing the moving body.

The GPS receiver 2 generates carrier phase difference observables from signals received from a plurality of GPS satellites through the GPS antennas 1 and outputs the carrier phase difference observables to the integer ambiguity estimator 4 together with information on the reference antenna position and satellite positions (ephemeris). The carrier phase difference observables generated by the GPS receiver 2 may either single phase differences or double phase differences.

The integer ambiguity estimator 4 estimates integer ambiguity candidates from measurement data fed from the GPS receiver 2 and performs mathematical operations which are discussed in detail below. First, the integer ambiguity estimator 4 obtains float solutions of integer ambiguities by using a well-known phase difference observation equation. For example, a carrier phase difference observable $\Delta\Phi_{ij}$ obtained in the navigation coordinate system by using a single phase difference observation model by equation (1) below:

$$\Delta\Phi_{ij} = \Delta\rho_{ij} - \Delta N_{ij} + \Delta e_i = (s_j)^T v_i - \Delta N_{ij} + \Delta e_i \quad (1)$$

$\Delta\rho_{ij}$: difference between distances from a satellite j to a pair of antennas forming a baseline vector i;

$\Delta N_{ij}$: difference between integer ambiguities observed in a line of sight of the satellite j;

$\Delta e_i$: observation error in single phase difference;

$v_i$: baseline vector i;

$s_j$: sightline unit vector pointing from the reference antenna to the satellite j;

where subscripts "i" and "j" affixed to a variable indicates that the variable is concerned with an i-th slave antenna and a j-th satellite, respectively.

It is possible to obtain integer ambiguities $\Delta N_{ij}$ and baseline vectors $v_i$ which are unknown quantities from P number of observation equation (1) above by applying a prior art method. Since values of $\Delta N_{ij}$ obtained from equation (1) are float solutions, the integer ambiguity estimator 4 obtains p number of integer ambiguity candidate sets $(N_1, N_2, \ldots, N_k)_p$ from the float solutions integer ambiguities by using the LAMBDA method, for example, which is conventional.

The GPS attitude calculator 5 substitutes each of the integer ambiguity candidate sets obtained as known quantities by the integer ambiguity estimator 4 into equation (1) and estimates baseline vectors by a conventional method, such as the least squares method or Kalman filter method. The baseline vectors thus estimated are used in order to time the correct integer ambiguity sets from the candidate sets. As there are p number of integer ambiguity candidate sets for each baseline vector i, p number of baseline vectors to be examined are produced at this point for each baseline vector i.

Once the baseline vectors to be examined are produced, it is then possible to obtain attitude information by a conventional method, such as the TRIAD algorithm if there are two baseline vectors available or the QUEST algorithm if there are more than two baseline vectors available (M. D. Shuster and S. D. Oh, "Three-axis attitude determination from vector observation," Journal of Guidance and Control, vol. 4, No. 1, 1981, pp. 70-77). Here, the attitude information refers to information including at least one of three parameters, that is, angles of roll $\theta_r$, pitch $\theta_p$ and yaw (heading) $\theta_y$ of the moving body. If there is only one baseline vector available, although it is impossible to determine roll angle $\theta_r$ of the moving body since the x-axis of the body coordinate system matches the intended moving direction (heading) of the moving body, it is possible to determine pitch angle $\theta_p$ and yaw angle (heading) $\theta_y$ by equations (2a) and (2b) below:

$$\theta_p = \tan^{-1}\left[\frac{z^n}{\sqrt{(x^n)^2 + (y^n)^2}}\right] \quad (2a)$$

$$\theta_Y = \tan^{-1}\left[\frac{y^n}{x^n}\right] \quad (2b)$$

The estimated baseline vectors to be examined and the attitude information about the moving body thus obtained by the GPS attitude calculator 5 are output to the integer ambiguity validator 7 and used for examination and validation of the integer ambiguity candidate sets. The attitude information about the moving body is also output to the INS error estimator 9.

On the other hand, the reference attitude calculator 6 receives observables concerning accelerations and angular velocities of rotary motion of the moving body from the IMU 3, causes the observables to pass through a low-pass filter (LPF) to remove high-frequency noise components contained therein, where necessary, and calculates roll angle $\theta_r$, pitch angle $\theta_p$ and yaw angle (heading) $\theta_y$ of the moving body as described below.

Since accelerations due to rotary motion of the navigation coordinate system with respect to the earth and revolving motion of the earth with respect to an inertial coordinate system is so small compared to gravitational acceleration, this acceleration are ignorable. Consequently, accelerations output from the accelerometers of the IMU 3, namely specific force $A^b$ can be approximated by equation (3) below, where g is the local gravity which is a known quantity. Since the positive direction of the x-axis of the body coordinate system is taken to match the intended moving direction (heading) of the moving body as stated earlier, a velocity component measured in the body coordinate system can be approximated as $v^b(x^b, 0, 0)$.

$$A^b = \begin{bmatrix} a_x^b \\ a_y^b \\ a_z^b \end{bmatrix} = \begin{bmatrix} \dot{v}_x^b \\ \dot{v}_y^b \\ \dot{v}_z^b \end{bmatrix} + \begin{bmatrix} 0 & -\omega_z^b & \omega_y^b \\ \omega_z^b & 0 & -\omega_x^b \\ -\omega_y^b & \omega_x^b & 0 \end{bmatrix}\begin{bmatrix} v_x^b \\ 0 \\ 0 \end{bmatrix} - C_n^b\begin{bmatrix} 0 \\ 0 \\ g \end{bmatrix} \quad (3)$$

$(a_x^b, a_y^b, a_z^b)^T$: acceleration observation vector measured in the body coordinate system;

$(v_x^b 0, 0)^T$: velocity vector measured in the body coordinate system;

$(\dot{v}_x^b, \dot{v}_y^b, \dot{v}_z^b)^T$: motion acceleration vector measured in the body coordinate system;

$(\omega_x^b, \omega_y^b, \omega_z^b)^T$: angular velocity observation vector measured in the body coordinate system.

A rotation matrix obtained by rotation from the navigation coordinate system defined by a 3-2-1 sequence to the body coordinate system is expressed by equation (4) below:

$$C_n^b = \begin{bmatrix} \cos\theta_p\cos\theta_y & \cos\theta_p\sin\theta_y & -\sin\theta_p \\ \sin\theta_r\sin\theta_p\cos\theta_y - \cos\theta_r\sin\theta_y & \sin\theta_r\sin\theta_p\sin\theta_y + \cos\theta_r\cos\theta_y & \sin\theta_r\cos\theta_p \\ \cos\theta_r\sin\theta_p\cos\theta_y + \sin\theta_r\sin\theta_y & \cos\theta_r\sin\theta_p\sin\theta_y - \sin\theta_r\cos\theta_y & \cos\theta_r\cos\theta_p \end{bmatrix} \quad (4)$$

where $\theta_r$, $\theta_p$ and $\theta_y$ are roll angle, pitch angle and yaw angle (heading), respectively.

From equations (3) and (4), $$\begin{bmatrix} a_x^b \\ a_y^b \\ a_z^b \end{bmatrix} = \begin{bmatrix} \dot{v}_x^b + g\sin\theta_p \\ \dot{v}_y^b + \omega_z^b v_x^b - g\sin\theta_r\cos\theta_p \\ \dot{v}_z^b - \omega_y^b v_x^b - g\cos\theta_r\cos\theta_p \end{bmatrix} \quad (5)$$

Angular velocities on the right side of equation (5) are observables which are known. Except when the moving body produces a highly dynamic motion, such as a sudden start or stop, acceleration of motion of the moving body can be ignored. When the acceleration of the moving body is ignored, observables given by the accelerometers can eventually be approximated by equation (6) below:

$$\begin{bmatrix} a_x^b \\ a_y^b \\ a_z^b \end{bmatrix} \cong \begin{bmatrix} g\sin\theta_p \\ \omega_z^b v_x^b - g\sin\theta_r\cos\theta_p \\ -\omega_y^b v_x^b - g\cos\theta_r\cos\theta_p \end{bmatrix} \quad (6)$$

Even when the acceleration of motion of the moving body can not be ignored, it is possible to determine the acceleration of motion of the moving body by differentiating velocity of the moving body, or of the body coordinate system, calculated by later-described equation (7), for example, by using GPS velocity observables containing small errors in a low-frequency band.

On the other hand, velocity components of the moving body measured in the body coordinate system are unknown unless information from an external aid for measuring the velocity of the moving body is obtained. In the positioning apparatus of the present invention, the reference attitude calculator 6 calculates the velocity component of the moving body in the moving direction thereof referenced to the body coordinate system from GPS-derived velocities in the navigation coordinate system obtained from GPS observations by using equation (6) above. Equation (7) below is derived based on the fact that a velocity vector in the body coordinate system contains an x-component only and the velocity vector has the same magnitude regardless of whether the vector is referenced to the navigation coordinate system or the body coordinate system.

$$v_x^b \cong \sqrt{(v_x^n)^2+(v_y^n)^2+(v_z^n)^2} \quad (7)$$

The positioning apparatus of this embodiment can calculate the velocity component of the moving body in the moving direction thereof referenced to the body coordinate system from the GPS-derived velocities in the navigation coordinate system obtained from GPS observations as mentioned above or obtain the same from an external instrument, such as a Doppler sonar, capable of measuring the velocity component of the moving body in the moving direction thereof.

It is understood from the above discussion that the roll angle $\theta_r$ of the moving body can be calculated from observables given by the IMU 3 and information on the velocity of the moving body in the moving direction by using equation (8) below:

$$\theta_r \cong \tan^{-1}[(a_y^b - \omega_z^b v_x^b)/(a_z^b + \omega_y^b v_x^b)] \quad (8)$$

Similarly, the pitch angle $\theta_p$ of the moving body can be calculated from the observables given by the IMU 3 and by using equation (9) below:

$$\theta_p \cong \tan^{-1}(a_x^b/g) \quad (9)$$

Since the pitch angle $\theta_p$ can be obtained from only the specific force $A^b$ output from the accelerometers, the IMU 3 may include the accelerometers alone if it is necessary to obtain only the pitch angle $\theta_p$.

As an alternative, the roll angle $\theta_r$ and the pitch angle $\theta_p$ of the moving body may be calculated from only the observables given by the accelerometers of the IMU 3 while ignoring the velocity and acceleration of motion of the moving body in the body coordinate system. Although accuracy of calculation of the roll angle $\theta_r$ and the pitch angle $\theta_p$ might more or less decrease in this case, this alternative approach advantageous in that the carrier phase-based relative positioning apparatus can be configured with greater flexibility in design according to accuracy requirements and other conditions, such as the amount of computational tasks of varying complexity.

The yaw angle (heading) $\theta_y$ of the moving body used as a reference for judgment by the heading of the moving body can be obtained from the velocity of the moving body referenced to the navigation coordinate system calculated by using the measurement data obtained by the GPS receiver 2 by equation (10) below:

$$\theta_y = \tan^{-1}(v_y^n/v_x^n) \quad (10)$$

where, if $v_y^n > 0$ and $v_x^n < 0$ then $\theta_y = \theta_y + \pi$ if $v_y^n < 0$ and $v_x^n < 0$ then $\theta_y = \theta_y + \pi$ if $v_y^n < 0$ and $v_x^n > 0$ then $\theta_y = \theta_y + 2\pi$ In this method, it is impossible to calculate the heading $\theta_y$ when the moving body is completely in stationary. However, since the accuracy of velocity calculated by using the measurement data obtained by the GPS receiver 2 is typically a few centimeters per second, it is possible to calculate the heading $\theta_y$ of the moving body if the moving body is moving even a little.

The integer ambiguity validator 7 is a processor for examining and validating the integer ambiguity candidates estimated by the integer ambiguity estimator 4 by using the attitude information calculated by the reference attitude calculator 6 as stated earlier. Operation performed by the integer ambiguity validator 7 is as explained below, for example.

The integer ambiguity validator 7 examines the integer ambiguity candidate sets estimated by the integer ambiguity estimator 4 based on the carrier phase difference observables and the baseline vectors estimated by the GPS attitude calculator 5 by using a conventionally known baseline length validation method and/or statistical validation method. In a case where there are two or more baseline vectors, the integer ambiguity validator 7 can also use other conventionally known validation methods, such as validation by using an inner product and/or a cross product of each pair of baseline vectors. In addition to using these validation methods, the integer ambiguity validator 7 of the present embodiment examines a difference between attitude calculated by the GPS attitude calculator 5 and attitude calculated by the reference attitude calculator 6 to judge whether each integer ambiguity candidate set is correct or not. A criterion (or threshold) used for ambiguity validation based on the attitude information may be predefined based on an expected attitude error in consideration of estimation errors in the attitude information calculated by the reference attitude calculator 6, for example.

The INS calculator 8 calculates the position, velocity and full attitude information (including roll angle $\theta_r$, pitch angle $\theta_p$ and heading $\theta_y$) of the moving body by a conventionally known method by using the position, velocity and attitude information obtained upon determination of a correct integer ambiguity candidate set as aiding information and outputs the position, velocity and full attitude information thus calculated by the INS calculator 8.

The INS error estimator 9 estimates IMU sensor errors and navigational errors based on differences between the position, velocity and attitude information obtained by the GPS attitude calculator 5 and the position, velocity and attitude information obtained by the INS calculator 8 by using Kalman filter. These estimated errors are corrected by negative feedback.

The inertial sensor errors are corrected upon determination of the correct integer ambiguity candidate set. Therefore, once the correct integer ambiguity candidate set is determined, it is possible for the reference attitude calculator 6 to obtain more accurate attitude information of the moving body than before determination of the correct integer ambiguity candidate set. Accordingly, the criterion used by the integer ambiguity validator 7 for validation of the integer ambiguity candidate sets may be set the threshold to test at different levels before and after correction of the inertial sensor errors.

Now, operation of the carrier phase-based relative positioning apparatus according to the present embodiment of the invention is described with reference to FIG. 3 which is a flowchart showing an exemplary operating procedure performed by the integer ambiguity validator 7 for examining and validating the integer ambiguity candidates. For the sake of the following discussion, it is assumed that the carrier phase-based relative positioning apparatus includes at least two GPS antennas 1 rigidly installed on the moving body as stated earlier and one of the integer ambiguity candidate sets obtained by using a conventional method like the LAMBDA method contains true integer ambiguities.

Figure 3:
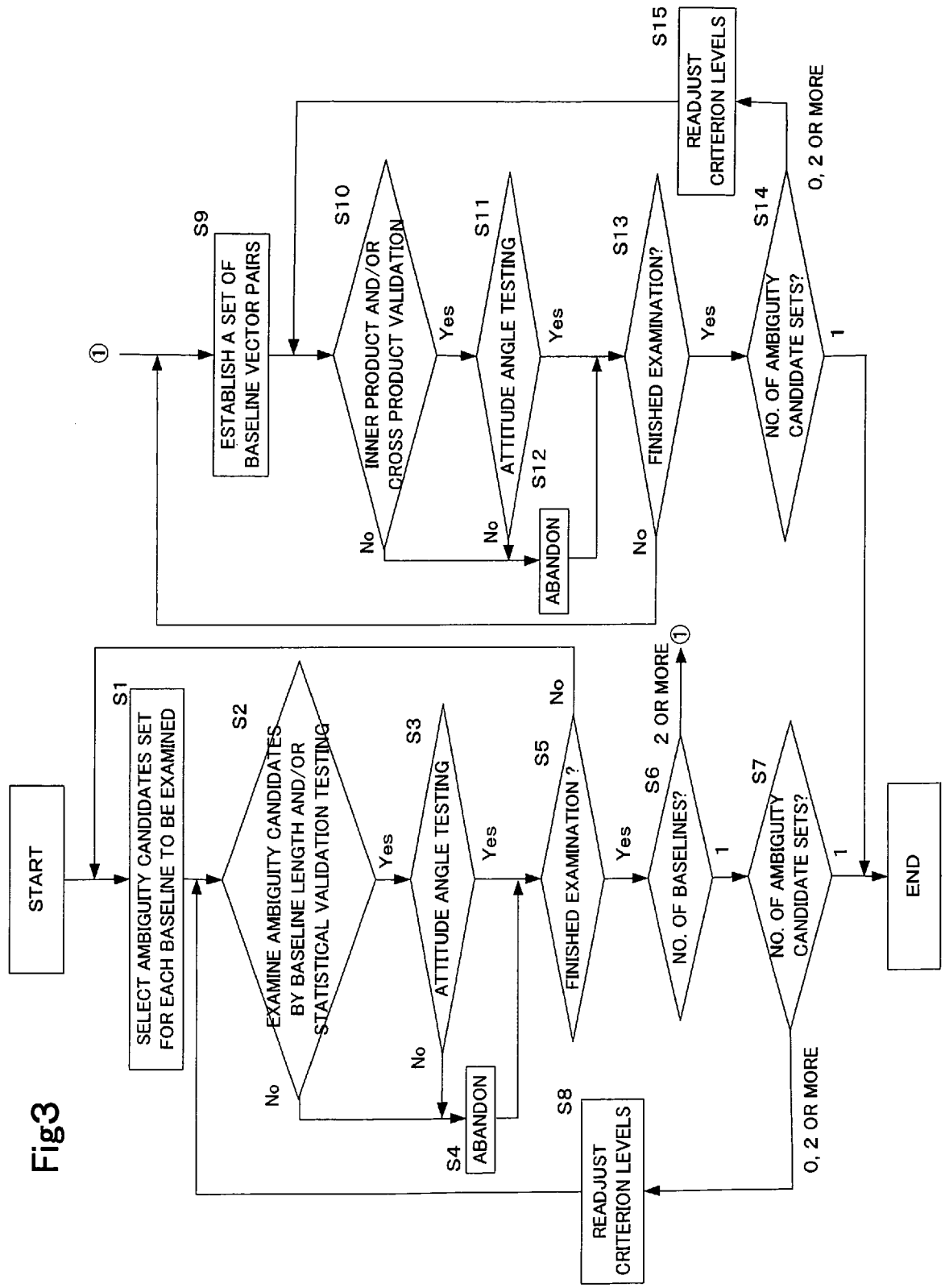
FIG. 3 is a flowchart showing an operating procedure performed by an integer ambiguity validator of the carrier phase-based relative positioning apparatus according to the embodiment of the invention.

Referring to FIG. 3, steps S1 through S8 show a process of examining the integer ambiguity candidate sets performed for each baseline vector to be examined while step S9 onward show a process applied to a case where there exist a plurality of baseline vectors to be examined.

In step S1 of FIG. 3, the integer ambiguity validator 7 defines a validation scheme (procedure) upon receiving the integer ambiguity candidate sets estimated by the integer ambiguity estimator 4. If there is more than one baseline, there exists one integer ambiguity candidate set per baseline. Thus, the integer ambiguity validator 7 selects an integer ambiguity candidate set for each baseline to be examined.

In step S2, the integer ambiguity validator 7 examines correctness of the integer ambiguity candidates based on the baseline length of each baseline vector to be examined or by the statistical validation method upon receiving the baseline vectors to be examined estimated by the GPS attitude calculator 5. Needless to say, the integer ambiguity validator 7 may be programmed to skip this step and proceed to succeeding step S3.

In step S3, the integer ambiguity validator 7 evaluates correctness of the integer ambiguity candidates based on a comparison between the attitude information calculated by the GPS attitude calculator 5 based on estimated base line from the integer ambiguity candidate sets and the attitude information calculated by the reference attitude calculator 6. Details of this step will be later discussed with reference to FIG. 4.

If the difference between the attitude information estimated by the GPS attitude calculator 5 and the attitude information calculated by the reference attitude calculator 6 falls within a range of the aforementioned predefined criterion, the integer ambiguity validator 7 allows the relevant integer ambiguity candidate set to pass attitude angle testing of step S3 and proceeds to step S5. If the integer ambiguity candidate set is rejected in step S3, the integer ambiguity validator 7 abandons in step S4 and proceeds to step S5.

The aforementioned operations of steps S1 through S4 are repeatedly carried out on all the integer ambiguity candidate sets corresponding to all of the baseline vectors to be examined. The integer ambiguity validator 7 judges whether the aforementioned examination process of steps S1 through S4 has been performed on all the integer ambiguity candidate sets in step S5.

In step S6, the integer ambiguity validator 7 checks out the number of baseline vectors to be examined, and determine following test process. If there is only one baseline vector to be examined, the integer ambiguity validator 7 proceeds to step S7. In a case where more than one baseline vector to be examined exists, on the other hand, there are two options to take with respect to further examination and validation of the integer ambiguity candidates. A first option is to proceed to step S7 if there remains only one (or zero) integer ambiguity candidate set for each baseline vector to be examined, on the one hand, and to perform further examination/validation processes of step S9 onward only if there remain more than one integer ambiguity candidate set. A second option is to perform the further examination/validation processes of step S9 onward regardless of whether there remains only one (not zero) or more than one integer ambiguity candidate set. Naturally, it is expected the second option would produce more accurate results.

In step S7, the integer ambiguity validator 7 checks out the number of integer ambiguity candidate sets remaining for each baseline vector to be examined. Specifically, if there remains only one integer ambiguity candidate set, the integer ambiguity validator 7 judges that this integer ambiguity candidate set gives a correct integer ambiguity and, then, the integer ambiguity validator 7 terminates the foregoing examination/validation procedure of FIG. 3. Otherwise, the integer ambiguity validator 7 readjusts levels of criteria used for judgments in steps S2 and S3 as appropriate (step S8) and then performs steps S2 through S7 again. Preferably, the criteria should be set at less stringent levels when the number of the remaining integer ambiguity candidate sets is zero, more stringent levels when the number of the remaining integer ambiguity candidate sets is more than one.

In step S9, the integer ambiguity validator 7 determines a set of baseline vector pairs used for examining and validating the integer ambiguity candidates with two baseline vectors among m number of baseline vectors (m≧2) and selects a baseline vector pair to be examined at first. If each baseline vector of the baseline vector pair to be examined has a plurality of integer ambiguity candidates in step S9, there exist baseline vectors to be examined corresponding to the respective integer ambiguity candidates and, thus, the integer ambiguity validator 7 selects the baseline to be examined vector pair to be examined at first for each baseline vector pair.

In step S10, the integer ambiguity validator 7 performs conventionally known examination/validation processes based on an inner product and/or a cross product of the baseline vector to be examined pair selected in step S9. Needless to say, the integer ambiguity validator 7 may be programmed to skip this step and proceed to succeeding step S11.

In step S11, the integer ambiguity validator 7 evaluates correctness of the integer ambiguity candidates based on a comparison between the attitude information calculated by the GPS attitude calculator 5 based on estimated baseline and the attitude information calculated by the reference attitude calculator 6. Details of this step will be later discussed with reference to FIG. 5.

If the difference between the attitude information calculated by the GPS attitude calculator 5 based on estimated baseline and the attitude information calculated by the reference attitude calculator 6 falls within a range of the aforementioned predefined criterion, the integer ambiguity validator 7 allows the relevant integer ambiguity candidate set to pass attitude angle testing of step S11 and proceeds to step S13. If the integer ambiguity candidate set is rejected in step S11, the integer ambiguity validator 7 abandons in step S12 and proceeds to step S13.

The aforementioned operations of steps S9 through S12 are repeatedly carried out on all the baseline vector to be examined pairs. The integer ambiguity validator 7 judges whether the aforementioned examination process of steps S9 through S12 has been performed on all the baseline vector to be examined pairs in step S13.

As in a judgment made in step S7, the integer ambiguity validator 7 checks out the number of remaining integer ambiguity candidate sets in step S14. If there remains only one integer ambiguity candidate set, the integer ambiguity validator 7 judges that this integer ambiguity candidate set gives a correct integer ambiguity and, then, the integer ambiguity validator 7 terminates the foregoing examination/validation procedure of FIG. 3. If there remains zero or more than one integer ambiguity candidate set for each baseline vector, the integer ambiguity validator 7 readjusts levels of criteria used for judgments in steps S10 and S11 as appropriate (step S8) and then performs steps S10 through S14 again. Preferably, the criteria should be set at less stringent levels when the number of the remaining integer ambiguity candidate sets is zero, more stringent levels when the number of the remaining integer ambiguity candidate sets is more than one.

Operation performed in step S3 of FIG. 3 is now described in detail with reference to FIG. 4 which is a flowchart showing details of an attitude angle testing subroutine of step S3.

In step S21, the GPS attitude calculator 5 estimates the baseline vectors to be examined based on the integer ambiguity candidates estimated by the integer ambiguity estimator 4 and then calculates attitude (pitch, heading) of the moving body.

In step S22, the reference attitude calculator 6 calculates the pitch angle $\theta_p$ which is used as a reference in examining and validating the integer ambiguity candidates by equation (9) discussed earlier. In step S23, the integer ambiguity validator 7 makes a judgment on the correctness of the integer ambiguity candidates based on a comparison between the pitch angle $\theta_p$ calculated in step S22 and the pitch angle $\theta_p$ calculated by the reference attitude calculator 6 from the baseline vectors to be examined. Specifically, the integer ambiguity validator 7 judges the correctness of the integer ambiguity candidates depending on whether a difference between the pitch angle $\theta_p$ calculated by equations (2a) and (2b) from the baseline vectors to be examined and the pitch angle $\theta_p$ calculated by equation (9) from the observables given by the inertial sensors of the IMU 3 falls within a range of a predefined judgment criterion. If the judgment result in step S23 is in the negative, the integer ambiguity validator 7 proceeds to step S4 of FIG. 3.

In step S23, the integer ambiguity validator 7 judges whether it is possible to obtain a correct value of the heading $\theta_y$ of the moving body from GPS-derived velocities. Specifically, this judgment is made based on whether a velocity of the moving body in the navigation coordinate system derived from GPS is larger than a predefined threshold. If the velocity of the moving body satisfies a relationship expressed by equation (11) shown below in step S24, the reference attitude calculator 6 calculates the heading $\theta_y$ which is used as a reference in examining and validating the integer ambiguity candidates by equation (10) discussed earlier in step S25. If the judgment result in step S24 is in the negative, the integer ambiguity validator 7 proceeds to step S5 of FIG. 3. Here, the aforementioned threshold should be set at a value of velocity at which the moving body can be regarded as moving taking into consideration errors in the GPS-derived velocity.

$$|v^n| \geq v_{th} \qquad (11)$$

$v^n$: x-component of velocity in navigation coordinate system;

$v_{th}$: predefined threshold.

In one feature of the embodiment, the velocity of the moving body may be subjected to signal processing to remove noise contained therein before the velocity of the moving body is against the predefined threshold. While only the velocity of the moving body derived from GPS is used in the aforementioned judgment on whether the moving body is moving, that is, on whether the heading $\theta_y$ of the moving body can be determined from the GPS-derived velocities, in the aforementioned embodiment, step S24 may include a judgment by a x-component and/or a y-component of the velocity of the moving body.

If the heading $\theta_y$ of the moving body used as the reference has been obtained in step S25, the integer ambiguity validator 7 examines and validates the integer ambiguity candidates in step S26. As in the aforementioned judgment of step S23 based on the pitch angle $\theta_p$ of the moving body, the integer ambiguity validator 7 judges the correctness of the integer ambiguity candidates depending on whether a difference between the heading $\theta_y$ calculated by equations (2a) and (2b) from the baseline vectors to be examined and the heading $\theta_y$ obtained in step S25 falls within a range of a predefined judgment criterion in this judgment based on the heading $\theta_y$ of the moving body. If the judgment result in step S26 is in the negative, the integer ambiguity validator 7 proceeds to step S4 of FIG. 3.

Figure 5:
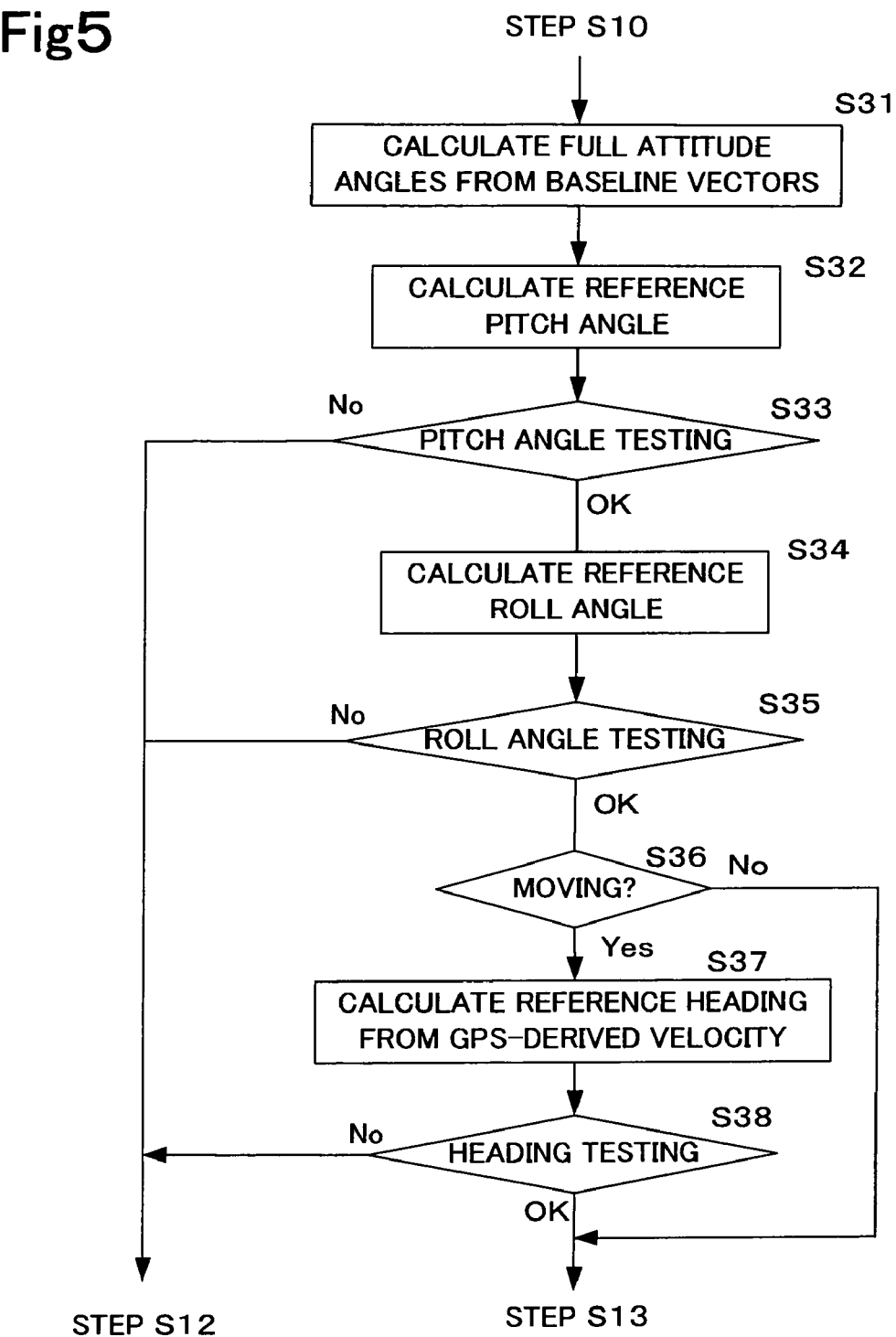
FIG. 5 is a flowchart showing details of an attitude angle testing subroutine based on a double baseline method.

Operation performed in step S11 of FIG. 3 is now described in detail with reference to FIG. 5 which is a flowchart showing details of an attitude angle testing subroutine of step S11.

In step S31, the INS calculator 8 calculates the full attitude information (including roll angle $\theta_r$, pitch angle $\theta_p$ and heading $\theta_y$) of the moving body by the earlier-mentioned conventionally known method by using the baseline vector to be examined pair to be examined selected in step S9 of FIG. 3.

Figure 4:
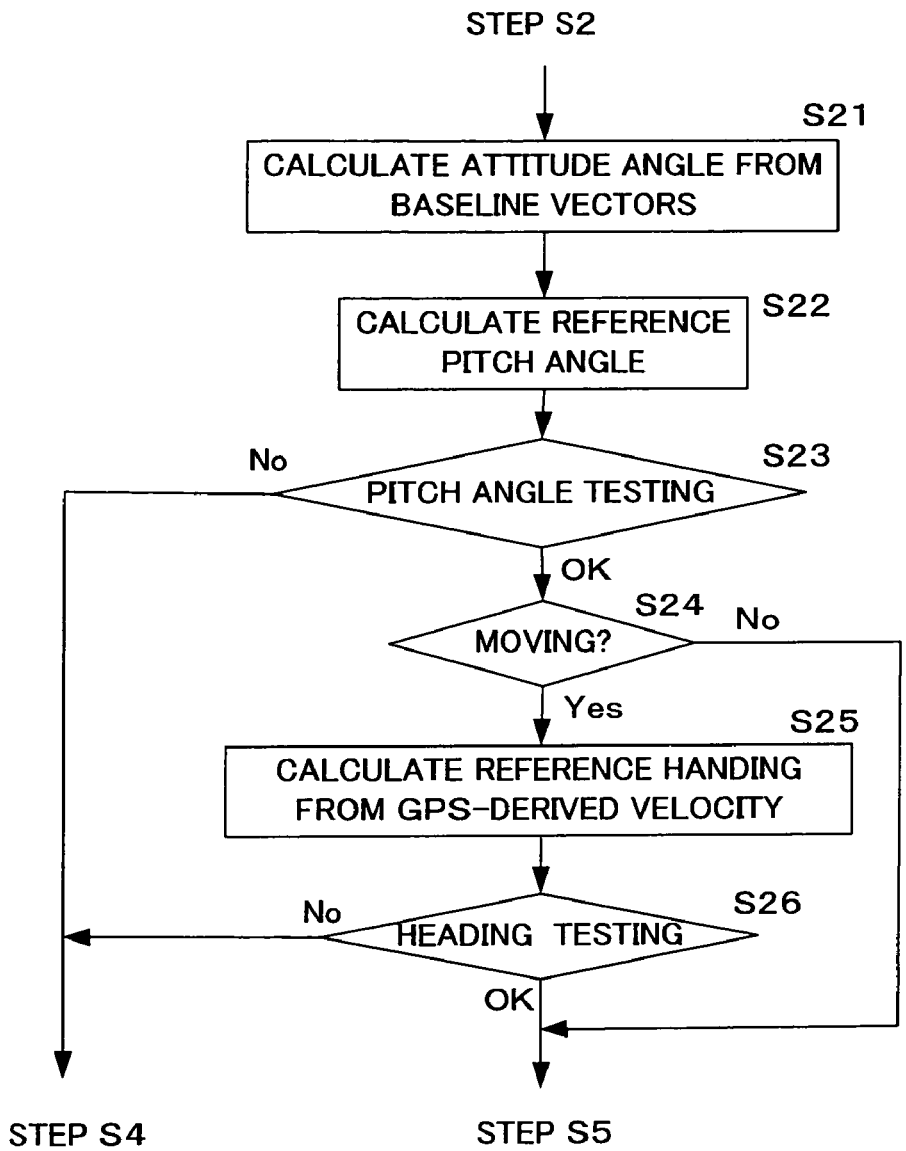
FIG. 4 is a flowchart showing details of an attitude angle testing subroutine based on a single baseline method.

Steps S32 and S33 are identical to steps S22 and S23 of FIG. 4, respectively. In step S34, the reference attitude calculator 6 calculates the roll angle $\theta_r$ which is used as a reference in examining and validating the integer ambiguity candidates by equation (8) discussed earlier.

In step S35; the integer ambiguity validator 7 judges the correctness of the integer ambiguity candidates depending on whether a difference between the roll angle $\theta_r$ calculated in step S34 and the roll angle $\theta_r$ estimated by the reference attitude calculator 6 falls within a range of a predefined judgment criterion.

Steps S36, S37 and S38 are identical to steps. S24, S25 and S26 discussed earlier with reference to FIG. 4, respectively.

As thus far discussed, the carrier phase-based relative positioning apparatus according to the preferred embodiment of the invention examines and validates the integer ambiguity candidates based on the attitude information obtained from the inertial sensors of the IMU 3. Therefore, unlike the earlier-described example of U.S. Pat. No. 6,611, 228, the carrier phase-based relative positioning apparatus of the embodiment permits examination and validation of the integer ambiguity candidates by using information on the attitude of the moving body not only in an event of integer ambiguity resolution but also in initial determination of integer ambiguities immediately after power-on. This means that the foregoing embodiment makes it possible to obtain correct integer ambiguity candidates at a high success rate by subjecting the integer ambiguity candidates to attitude angle testing at all times in addition to the conventionally known baseline length validation method, statistical validation method and/or other conventional validation methods, such as validation by using an inner product and/or a cross product of each baseline vector pair. The present invention makes it possible to examine and validate the integer ambiguity candidates at high speed and accuracy even when only a single baseline is available, contributing to a reduction in start-up time of the apparatus and achievement of compact design and low cost.

While the invention has been described with reference to the preferred embodiment applied to the GPS antennas 1, the invention is applicable not only to the GPS antennas 1 for receiving positioning signals from GPS satellites but also to antennas for receiving positioning signals transmitted from all or part of GLONASS satellites, GALILEO satellites and other types of positioning satellites like quasi-zenith satellites.

What is claimed is:

1. A carrier phase-based relative positioning apparatus comprising:

a plurality of antennas fixedly mounted at known positions of a moving body for receiving a positioning signal from a satellite;

an inertial sensing device fixedly mounted at a known position of the moving body for measuring at least acceleration of the moving body;

a reference attitude calculator for calculating attitude information about the attitude of the moving body by using an observable of said inertial sensing device at least before an integer ambiguity is initially determined;

an integer ambiguity estimator for estimating integer ambiguity candidates from the positioning signal received by said antennas; and an integer ambiguity validator for determining a correct integer ambiguity candidate by evaluating correctness of the integer ambiguity candidates based on a comparison between attitude information calculated by using the estimated integer ambiguity candidates and the attitude information calculated by said reference attitude calculator.

2. The carrier phase-based relative positioning apparatus according to claim 1, wherein said inertial sensing device includes an accelerometer, and said reference attitude calculator calculates at least one of roll and pitch angles of the moving body from an observable obtained by said accelerometer.

3. The carrier phase-based relative positioning apparatus according to claim 1, wherein said reference attitude calculator calculates velocity of the moving body in a moving direction thereof in a body coordinate system or obtains the same from an external source, and calculates roll angle of the moving body from the velocity of the moving body in the moving direction thereof and an observable obtained from said inertial sensing device.

4. The carrier phase-based relative positioning apparatus according to claim 3, wherein one of baselines formed by said plurality of antennas lies along the moving direction of the moving body, and said reference attitude calculator calculates the velocity of the moving body in the moving direction thereof in the body coordinate system from velocity of the moving body in a navigation coordinate system calculated by using the signal received by said antenna on the assumption that only the velocity of the moving body in the moving direction thereof is a velocity component of the moving body in the body coordinate system.

5. The carrier phase-based relative positioning apparatus according to claim 1, wherein said reference attitude calculator includes a heading calculator for detecting heading of the moving body from velocity thereof in a navigation coordinate system calculated by using the signal received by said antenna.

6. The carrier phase-based relative positioning apparatus according to claim 1 further comprising an inertial sensing device error estimator for estimating an error of said inertial sensing device after the integer ambiguity candidate has been determined, wherein said integer ambiguity validator change the threshold of criterion used for validation of the integer ambiguity candidate at different levels before and after correction of the error of said inertial sensing device.

7. The carrier phase-based relative positioning apparatus according to claim 2 further comprising an inertial sensing device error estimator for estimating an error of said inertial sensing device after the integer ambiguity candidate has been determined, wherein said integer ambiguity validator change the threshold of criterion used for validation of the integer ambiguity candidate at different levels before and after correction of the error of said inertial sensing device.

8. The carrier phase-based relative positioning apparatus according to claim 3 further comprising an inertial sensing device error estimator for estimating an error of said inertial sensing device after the integer ambiguity candidate has been determined, wherein said integer ambiguity validator change the threshold of criterion used for validation of the integer ambiguity candidate at different levels before and after correction of the error of said inertial sensing device.

9. The carrier phase-based relative positioning apparatus according to claim 4 further comprising an inertial sensing device error estimator for estimating an error of said inertial sensing device after the integer ambiguity candidate has been determined, wherein said integer ambiguity validator change the threshold of criterion used for validation of the integer ambiguity candidate at different levels before and after correction of the error of said inertial sensing device.

10. The carrier phase-based relative positioning apparatus according to claim 5 further comprising an inertial sensing device error estimator for estimating an error of said inertial sensing device after the integer ambiguity candidate has been determined, wherein said integer ambiguity validator change the threshold of criterion used for validation of the integer ambiguity candidate at different levels before and after correction of the error of said inertial sensing device.

11. A method of positioning by using carrier phase based on information obtained by a plurality of antennas fixedly mounted at known positions of a moving body for receiving a positioning signal from a satellite and an inertial sensing device fixedly mounted at a known position of the moving body for measuring at least acceleration of the moving body, said positioning method comprising:

a reference attitude calculating process for calculating attitude information about the attitude of the moving body by using an observable of said inertial sensing device at least before an integer ambiguity is initially determined;

an integer ambiguity estimating process for estimating integer ambiguity candidates from the positioning signal received by said antennas; and an integer ambiguity validating process for determining a correct integer ambiguity candidate by evaluating correctness of the integer ambiguity candidates based on a comparison between attitude information calculated by using the estimated integer ambiguity candidates and the attitude information calculated in said reference attitude calculating process.

12. The positioning method according to claim 11, wherein said inertial sensing device includes an accelerometer, and said reference attitude calculating process includes calculating at least one of roll and pitch angles of the moving body from an observable obtained by said accelerometer.

13. The positioning method according to claim 11, wherein said reference attitude calculating process includes calculating velocity of the moving body in a moving direction thereof in a body coordinate system or obtaining the same from an external source, and calculating roll angle of the moving body from the velocity of the moving body in the moving direction thereof and an observable obtained from said inertial sensing device.

14. The positioning method according to claim 13, wherein one of baselines formed by said plurality of antennas lies along the moving direction of the moving body, and said reference attitude calculating process includes calculating the velocity of the moving body in the moving direction thereof in the body coordinate system from velocity of the moving body in a navigation coordinate system calculated by using the signal received by said antenna on the assumption that only the velocity of the moving body in the moving direction thereof is a velocity component of the moving body in the body coordinate system.

15. The positioning method according to claim 11, wherein said reference attitude calculating process includes detecting heading of the moving body from velocity thereof in a navigation coordinate system calculated by using the signal received by said antenna.

16. The positioning method according to claim 11 further comprising an inertial sensing device error estimating process for estimating an error of said inertial sensing device after the integer ambiguity candidate has been determined, wherein said reference attitude calculating process change the threshold of criterion used for validation of the integer ambiguity candidate at different levels before and after correction of the error of said inertial sensing device.

17. The positioning method according to claim 12 further comprising an inertial sensing device error estimating process for estimating an error of said inertial sensing device after the integer ambiguity candidate has been determined, wherein said reference attitude calculating process change the threshold of criterion used for validation of the integer ambiguity candidate at different levels before and after correction of the error of said inertial sensing device.

18. The positioning method according to claim 13 further comprising an inertial sensing device error estimating process for estimating an error of said inertial sensing device after the integer ambiguity candidate has been determined, wherein said reference attitude calculating process change the threshold of criterion used for validation of the integer ambiguity candidate at different levels before and after correction of the error of said inertial sensing device.

19. The positioning method according to claim 14 further comprising an inertial sensing device error estimating process for estimating an error of said inertial sensing device after the integer ambiguity candidate has been determined, wherein said reference attitude calculating process change the threshold of criterion used for validation of the integer ambiguity candidate at different levels before and after correction of the error of said inertial sensing device.

20. The positioning method according to claim 15 further comprising an inertial sensing device error estimating process for estimating an error of said inertial sensing device after the integer ambiguity candidate has been determined, wherein said reference attitude calculating process change the threshold of criterion used for validation of the integer ambiguity candidate at different levels before and after correction of the error of said inertial sensing device.

* * * * *